United States Patent [19]

Taylor et al.

[11] Patent Number: 4,871,217
[45] Date of Patent: Oct. 3, 1989

[54] PLASTIC CARRIER BOX

[75] Inventors: Gerald W. Taylor; Lawrence C. Stanek, both of Akron, Ohio

[73] Assignee: Myers Industries, Akron, Ohio

[21] Appl. No.: 174,355

[22] Filed: Mar. 28, 1988

[51] Int. Cl.⁴ ............................................. E05B 65/46
[52] U.S. Cl. ................................... 312/216; 312/290; 312/348
[58] Field of Search ............................. 312/216–222, 312/293, 348, 342, 345, 290

[56] References Cited

U.S. PATENT DOCUMENTS

| 1,111,026 | 9/1914 | Kroos | 312/245 |
|---|---|---|---|
| 1,350,047 | 8/1920 | Way | 312/216 |
| 2,011,189 | 8/1935 | Anderson | 312/293 X |
| 2,440,541 | 4/1948 | Gash | 312/217 |
| 3,639,028 | 2/1972 | Black | 312/348 |
| 4,245,422 | 1/1981 | Souza | 312/DIG. 33 |
| 4,616,890 | 10/1986 | Romick | 312/216 X |
| 4,684,178 | 8/1987 | Craig | 312/217 X |

Primary Examiner—Joseph Falk
Attorney, Agent, or Firm—Oldham & Oldham Co.

[57] ABSTRACT

A molded plastic carrier case is provided which forms an enclosure and which enclosure has ends and a bottom, and a pair of support walls positioned inside the enclosure with one support wall at each end of the enclosure, the enclosure having a front with an opening therein, and a tray, slidably supported at its ends on the support walls, and movable out through the enclosure opening. Additionally a lock bar is provided within the carrier case enclosure and is pivotal through a limited arc in a vertical plane for engaging an associated lock section formed on a rear portion of a tray slidably received within the carrier enclosure.

8 Claims, 4 Drawing Sheets

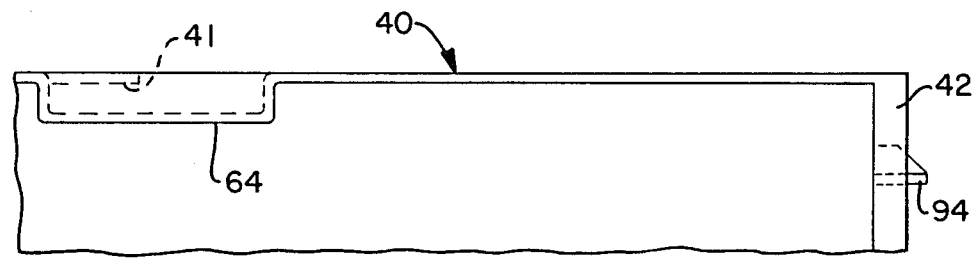
FIG.-6
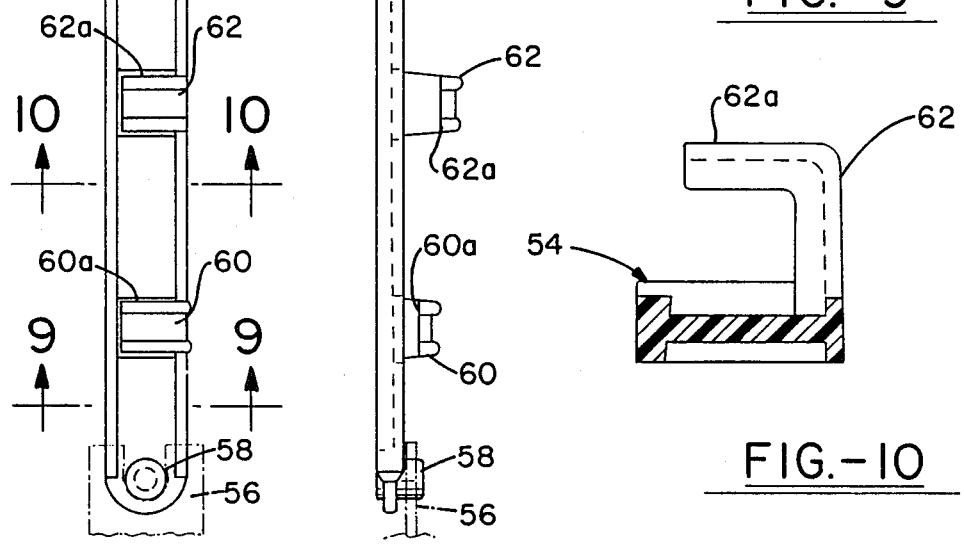
FIG.-7   FIG.-8
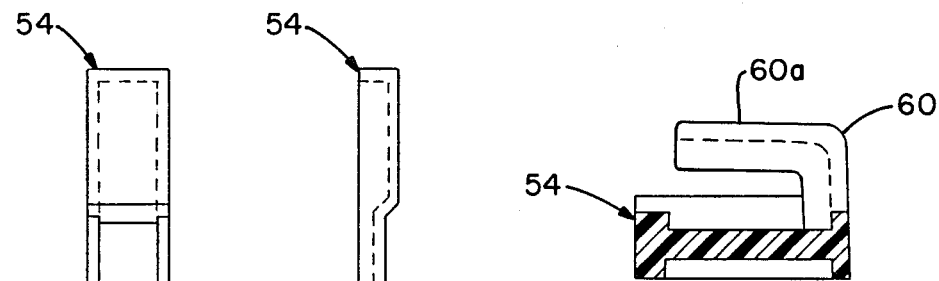
FIG.-9
FIG.-10

PLASTIC CARRIER BOX

BACKGROUND ART

This invention relates to carrier cases, such as tool boxes or fishing tackle boxes wherein some kind of enclosure or case is provided and normally one or more trays are positioned within this carrier case and are movable or slidable so as to be exposed forwardly of or outwardly of the carrier case enclosure. Many different types of these carrier cases have been provided with pivotal linkage action being used in many instances for moving the carrier trays out to an exposed position, or for retracting them to be folded in an enclosure provided by the carrier case. In making carrier cases from plastic materials obviously a very large mold is required and such large mold is provided with a number of complex shapes to be provided by the molding action, which mold becomes very expensive and is a complicated article.

In many instances it has been undesirable to provide expensive linkage means for mounting carrier trays in these carrier cases whereby some type of carrier case with slidable trays that are movable out to expose the contents of the tray are desired. If slidable trays are provided in the carrier case, it is desirable to provide some type of locking means for holding the trays within the carrier case to avoid undesired release or slide action of the trays that might result in spilling the contents thereof when such release or exposure of the trays is obtained accidentally or at an undesired time.

Thus, it is the general object of the present invention to provide a plastic molded article carrier case that has flat or planar end walls and is relatively easily and inexpensively formed from a suitable conventional plastic material.

Another object of the invention is to provide removable end support walls in the carrier case, one adjacent each end of the carrier case, for engaging and positioning a support tray for slidable action in the carrier case and which permits the tray to be moved or to slide outwardly of the case through a front opening therein to expose the contents of the tray.

Yet another primary object of the present invention is to provide a lock means or bar in an article carrier case which can engage and hold slide trays in the carrier case within the enclosure for release therefrom only at desired times and for a predetermined release action.

Still other objects of the present invention are to reduce the complexity and cost of molding plastic carrier cases by forming an enclosure case of substantially planar design, and to provide special support walls removably positioned within the carrier case to engage and position slide trays therein; to provide a plurality of support flanges and support ramps on the end walls in a carrier case to receive and position slide trays therein; to provide an inter-engaging portion on end walls of the carrier case and the support walls positioned within the carrier case to aid in maintaining the support walls in a desired position; to provide a special overhanging flange member on a lock bar in the carrier case for being received behind and engaging a lock flange or plate provided on a rear wall of a carrier tray of the unit; to provide forwardly extending offset sections in the rear walls of support trays to receive and limit pivotal movement of a lock arm or bar pivotally positioned within the carrier case; and to provide an attractive, durable shock-proof type of a carrier case made from molded plastic materials.

The foregoing and other objects and advantages of the present invention will be made more apparent as the specification proceeds.

BRIEF DESCRIPTION OF THE DRAWINGS

For a better understanding of the present invention, reference is made to the accompanying drawings wherein:

FIG. 6 is a top view of the drawer shown in FIG. 5;

FIG. 7 is a frontal elevational view of the drawer lock member;

FIG. 8 is a side elevational view of the drawer lock member shown in FIG. 7;

FIG. 9 is a cross-sectional view as taken on line 9—9 of FIG. 7;

FIG. 10 is a cross-sectional view as taken on line 10—10 of FIG. 7; and

BEST MODE FOR CARRYING OUT THE INVENTION

Figure 1:
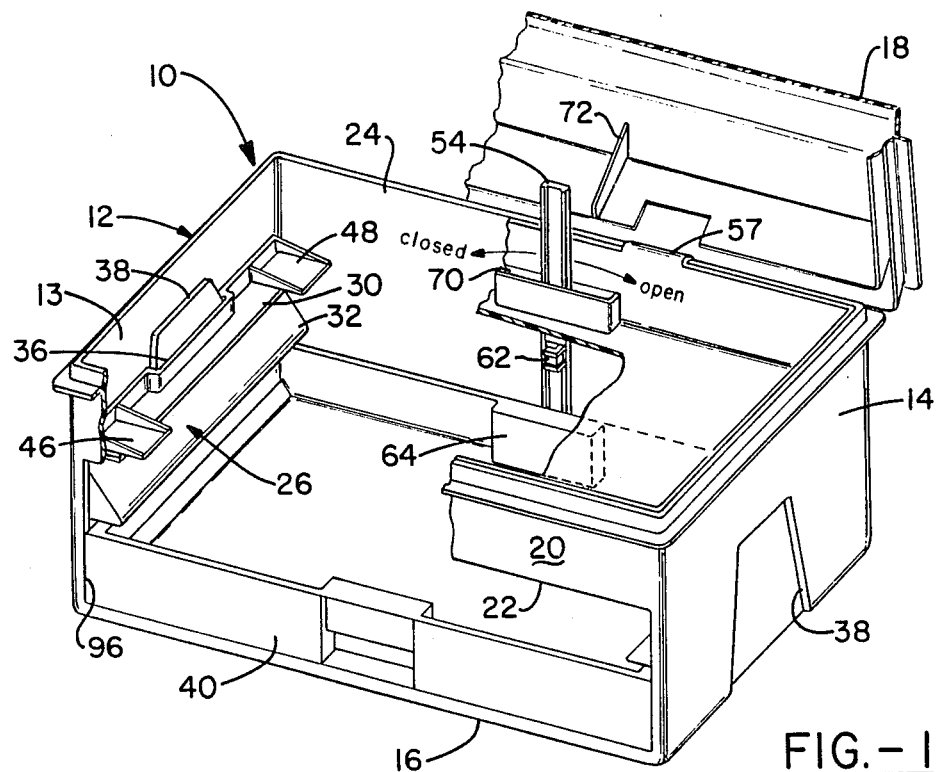
FIG. 1 is a perspective view, partially broken away, of the tool chest comprising the invention.
Figure 2:
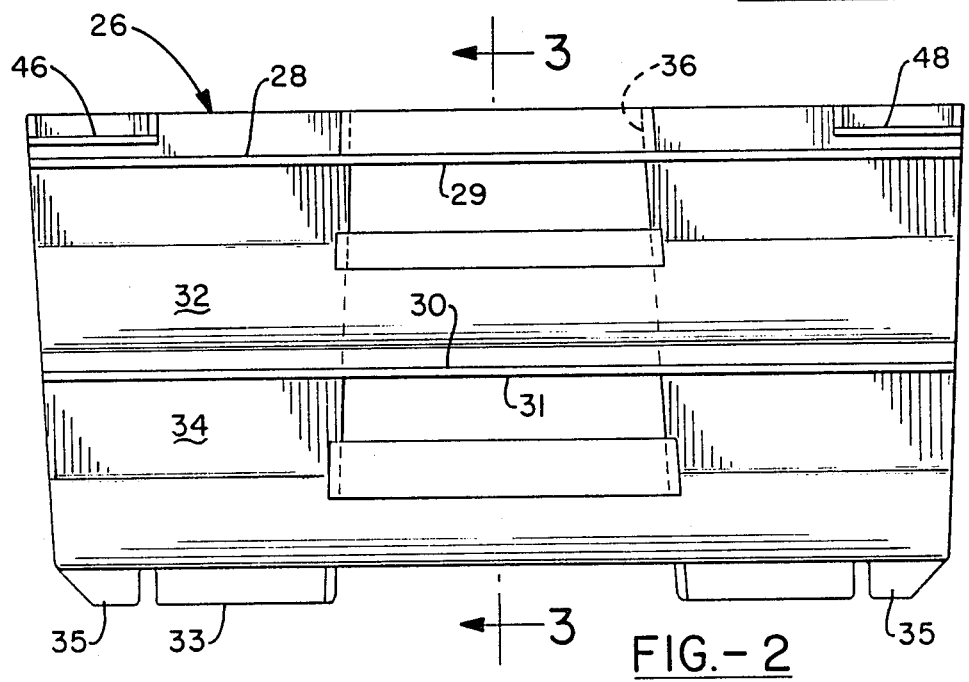
FIG. 2 is a frontal elevation of the removable end support.
Figure 3:
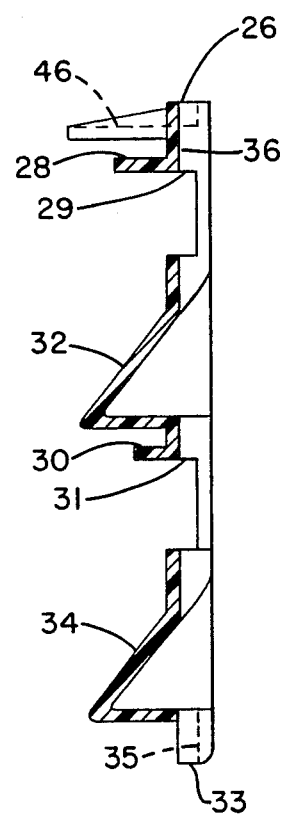
FIG. 3 is a cross-sectional view as taken on line 3—3 of FIG. 2.
Figure 4:
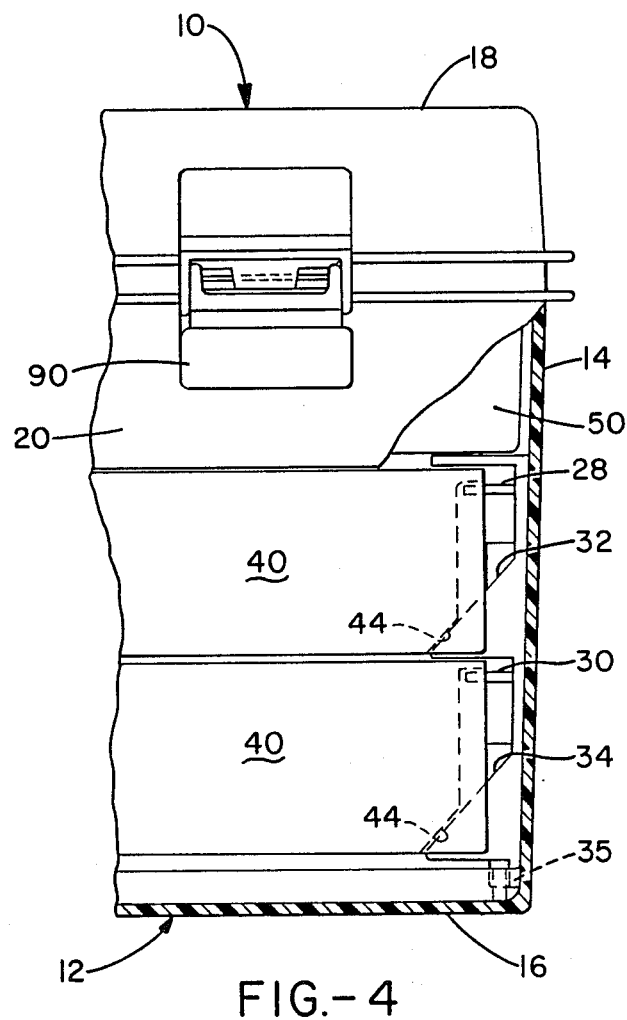
FIG. 4 is a partial frontal elevation view of the tool chest and partially broken away to expose the drawers and associated end support member.
Figure 5:
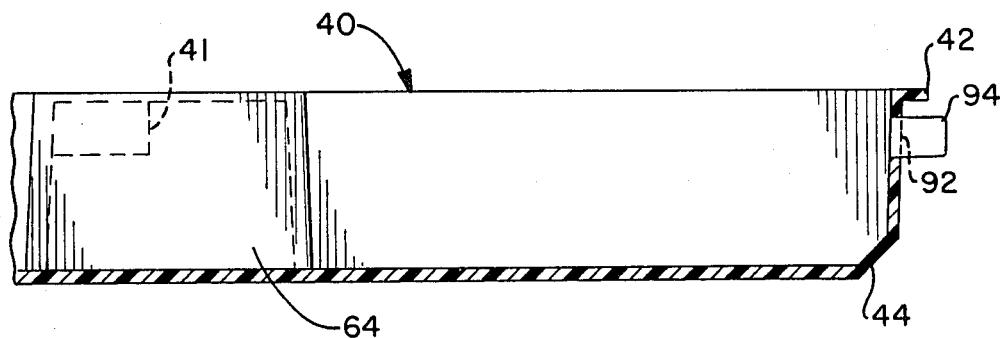
FIG. 5 is a sectional elevational view of a drawer showing the rear portion and approximately three quarters of its width.

With reference to the details of the structure shown in the drawings, an article carrier, or tool chest, is indicated as a whole by the numeral 10. This article carrier includes a carrier case 12 which preferably is made from plastic material and is molded as a unit which has ends 13 and 14, a bottom 16, and a top 18, which is pivotally secured to the carrier case 12. The carrier case additionally has a front 20 with a relatively large opening 22 provided therein and a back 24.

As a feature of the invention, the carrier case 12 has no slide tray supports provided therein of a permanent molded nature but in lieu thereof, removably end walls or drawer and tray supports 26 are positioned within the carrier case 12 at each end thereof. These end supports 26 each have, usually, a pair of vertically spaced support flanges 28 and 30 that are adapted to engage with edge flanges on a tray for slide support action therefor. Additionally, the end supports likewise have inwardly and downwardly extending beveled supports 32 and 34 provided at vertically spaced portions of the end supports and extending front to rear thereof whereby a secondary support action can be provided for the trays which have lower edges or corners beveled complementary to the supports 32 and 34 on the end support for aiding in positioning the two trays slidably within the carrier case or enclosure 12.

The end walls or end supports 26 may have openings 29 and 31 formed therein in spaced vertical parts of the recess or recessed portion 36 of the end support. And bottom edges 33 are formed on the end supports to aid bottom end tabs 35 on the end supports to position the end supports in the carrier case. The bottom end tabs 35 seat in upwardly protuding, open top recesses formed on the inner surface of the bottom 16 to aid in positively locating the end supports immediately adjacent and parallel to the ends 13 and 14.

These end supports 26 also preferably have a tapered recess 36 formed in the outer wall thereof for engaging with a complementary tapered inwardly protruding offset section 38, extending into the carrier case and adapted to engage the recess 36 in each end support to aid in holding the end support firmly in position within the carrier case 12.

Slide Trays

Usually the carrier case 12 in combination with the two end supports 26 is adapted to position two trays 40 in the enclosure for slidable support within the enclosure on the support flanges 28 or 30 of the end supports. This tray 40 has an end flange 42 at each end thereof for engaging with these support flanges 28 for slidably positioning the trays within the enclosure. Additionally, at each end, the tray 40 is beveled as at 44 so that it is shaped complementary to the beveled support 32 of the end support and additional slide support is provided for each of the trays. Usually two of the trays 40 are positioned within the enclosure and they are adapted to be pulled or slidably moved out of the opening 22 in the front of the enclosure.

The end supports 26 each have small horizontal flanges 46 and 48 provided adjacent the ends of the end support at the top thereof for engaging with and supporting a tray 50 that is positioned in the open top of the enclosure 12 and would be lifted directly up vertically therefrom. This top tray may have any desired types of edge flanges 52 at spaced portions of the the front and back thereof for engaging with the upper edge of the enclosure 12 to aid in supporting the tray within the enclosure.

Tray Lock Means

The tool box 10 preferably includes a pivotally positioned lock bar 54 that is located adjacent the back wall 24 of the enclosure and is adapted to move in a plane parallel to this back wall. The lock bar 54 preferably is removably seated in a u-shaped recess in the upper end of a socket or support 56 usually integrally molded with the bottom 16 and extending upwardly therefrom. Such socket 56 rotatably receives a pivot or stub shaft 58 formed on or secured to the lock bar 54 at the lower end thereof, which shaft rotates in the socket 56 to provide the desired pivotal action of the lock bar.

Figure 11:
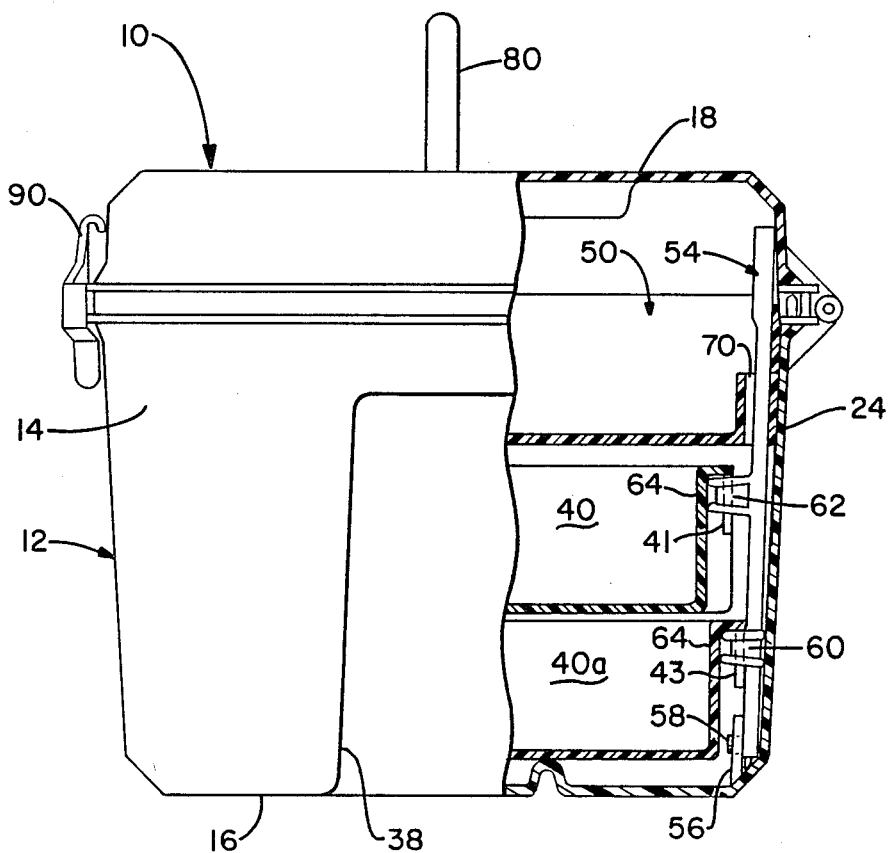
FIG. 11 is an end elevational view, partially broken away of the tool chest illustrating the drawer lock mechanism.

Additionally this lock bar 54 preferably has two overhanging lower and upper offset sections 60 and 62 provided at vertically spaced portions thereof and FIGS. 9 and 10 show that the lower offset section 60 is offset from the lock bar a shorter distance than the upper offset section 62. These offset sections are both open laterally in a common direction. The functioning of the lock bar 54 is to engage the overhanging portion 60a or 62a of the offset sections with a lock tab or flange formed on an associated rear wall section of one of the trays 40 so that the offset section 60a or 62a will engage with a lock tab 41 or 43 formed respectively on the two trays 40 and 40a as shown in FIG. 11. The pivotal movement of the lock bar 54 is adapted to swing the open ends of the offset sections 60a and 62a into engagement with these locking tabs 41 or 43 provided on the back walls of the trays, whereby one cannot slide the trays outwardly of the enclosure 12 when the offset tabs 41 and 43 and sections 60a and 62a are engaged.

The drawings also shown that the rear wall of each of the trays 40 and 40a has an inwardly extending offset section 64 provided thereon and the latch bar or lock bar 54 extends vertically up past these offsets 64 but with the offset section 60 and 62 of the lock bar being adapted to engage with the offset tabs 41 and 43 provided as integrally molded parts of the trays 40 and 40a. Additionally, this lock bar preferably extends up through an opening 70 provided in the top tray adjacent the rear portion thereof so that the upper end of the lock bar 54 can extend up to contact a lock tab or flange 72 provided on the top 18 of the carrier case and limit pivotal movement of the lock bar. The flange 72 is adapted to retain the lock bar in its locked position, which is normally at the lefthand margin of its pivotal movement within the carrier case when the top 18 is closed. When the lock bar is swung to the right edge of its limited movement arc, then the lock bar is not having either of the offset sections or legs 60 and 62 thereon in engagement with any of the tabs provided on the slide trays. Pivotal movement of the lock bar is limited by the extent or width of the offsets 64 and opening 70 provided in the rear wall of the trays.

The tool chest or article carrier of the invention can have any suitable handle 80 provided therefor and it has any desired type of lock members 90 provided on the front wall thereof for engaging with the top 18 and holding the top in a closed position.

Additionally, conventional types of lock tabs are shown at 92 on the outer wall of one of the molded plastic trays 40. This tab is cut out and is pivotally positioned in the wall of the tray and it has an extension 94 provided thereon for engaging the edge wall 96 of the front of the carrier case to prevent removal of the trays from the carrier case at undesired times. But by flexing the lock tab 92 inwardly of the tray, then the extension 94 thereon can be moved past the edge wall of the carrier case and the tray is released.

It should be noted that the end walls 13 and 14 of the carrier case are planar with at most an offset 38 molded into the end wall. Such shape is readily molded and no support flanges, tabs, ledges or the like need to be molded on the carrier case. The tray support means are all formed on the separate end supports or walls 26 of the tool box and a relatively uncomplicated mold can be used to form these separated artices.

The trays 40 and 50 or the like are all molded from a suitable plastic and they likewise are primarily flat or angular shapes which can be formed in non-complex molds. The lock bar 54 is also formed of plastic. Reinforcing ribs can be provided in the tool box with no serious molding problems.

It is believed that the tool chest or article carrier of the invention is a novel, attractive member, components of which can be molded in relatively uncomplicated molds to provide a sturdy carrier case at minimum cost. These carrier cases can be readily assembled and are of a durable, long life construction. Thus the objects of the invention have been achieved.

While in accordance with the patent statutes, a preferred embodiment and best mode has been presented, the scope of the invention is not limited thereto, but rather is measured by the scope of the attached claims.

What is claimed is:

1. An article carrier or tool chest comprising:

a carrier case forming an enclosure having ends and a bottom;

a pair of support walls positioned inside said enclosure with one support wall at each end of said enclosure, said enclosure having a front with an opening therein and a tray slidably supported at its ends on said support walls and being movable out through said enclosure opening; and a pivotal lock bar provided adjacent a rear wall of said carrier case positioned for limited movement in a vertical plane, in a manner that, in one pivoted position, said lock bar will engage a lock tab on the outer rear wall of said tray to retain said tray in said carrier case and to prevent outward sliding movement of said tray, and, in another pivoted position, said lock bar will not engage said lock tab.

2. An article carrier case as in claim 1 where said tray has a forwardly extending offset section in its rear wall and said lock bar extends along adjacent said offset section, a lock means being formed on said offset section, said lock bar having an overhanging portion open at a side thereof to receive and engage said lock means when pivoted to move into engagement therewith.

3. An article carrier as in claim 1 where a socket means is formed on the bottom wall of said enclosure, and a lock bar having a support end is removably positioned by its support end in said socket means, said socket means holding said lock bar against movement forwardly of said enclosure, said lock bar having at least one overhanging lock portion thereon for engaging said lock tab on said tray to hold it against outward slide movement.

4. An articles carrier as in claim 3 where said lock bar can pivot in a vertical plane adjacent a rear wall of said enclosure, in a manner that, in one pivoted position, said lock bar will engage said lock tab in an indented section in said tray's rear wall and in another pivoted position, said lock bar will not engage said lock tab.

5. An article carrier as in claim 4 with a locking means provided on t the top of said carrier case for engaging and limiting the pivotal movement of the upper end of said lock bar.

6. An article carrier as in claim 5 wherein locking means are provided by a lock flange provided on the top of said carrier case which limits pivotal movement of the upper end of said lock bar when the carrier case is closed.

7. An article carrier as in claim 1 with a locking means provided on the top of said carrier case for engaging and limiting the pivotal movement of the upper end of said lock bar.

8. An article carrier as in claim 7 wherein locking means are provided by a lock flange provided on the top of said carrier case which engages and limits pivotal movement of the upper end of said lock bar when the carrier case is closed.

* * * * *